United States Patent [19]

Noddings et al.

[11] 3,767,972

[45] Oct. 23, 1973

[54] SPEED RESPONSIVE SYSTEMS

[75] Inventors: John Noddings; Lawrence Edward Hyde; Roland Kenneth Borton, all of Leamington Spa, England

[73] Assignee: Associated Engineering Limited, Leamington Spa, Warwickshire, England

[22] Filed: Mar. 21, 1972

[21] Appl. No.: 236,658

[52] U.S. Cl. ................................. 317/5, 180/105 E
[51] Int. Cl. ............................................ B60k 31/00
[58] Field of Search ....................... 317/5; 180/105 E

[56] References Cited
UNITED STATES PATENTS

| | | | |
|---|---|---|---|
| 3,575,256 | 4/1971 | Jania | 180/105 E |
| 3,070,185 | 12/1962 | Fales | 180/105 E |
| 3,546,533 | 12/1970 | Lydick | 317/13 R |
| 3,484,686 | 12/1969 | Wade | 317/5 X |
| 3,406,775 | 10/1968 | Magnuski | 317/5 X |

Primary Examiner—J. D. Miller
Assistant Examiner—Harry E. Moose, Jr.
Attorney—Joseph F. Brisebois et al.

[57] ABSTRACT

This invention relates to a speed responsive system for a motor vehicle whereby the vehicle may be kept at a predetermined speed, or the driver may be warned when a predetermined speed is reached. In one embodiment, the system includes an inductive pick-up or transducer, which senses rotation of a ferrous-toothed disc rotatable with a shaft to generate a voltage dependent upon the rotational speed of the shaft. Means, comprising a potential divider or a memory circuit, are provided for generating a reference voltage, and a comparator circuit is provided for comparing the voltages, the comparator being arranged to emit or change its output signal when the speed responsive voltage, or a voltage derived therefrom, reaches the reference voltage.

5 Claims, 11 Drawing Figures

Fig.2

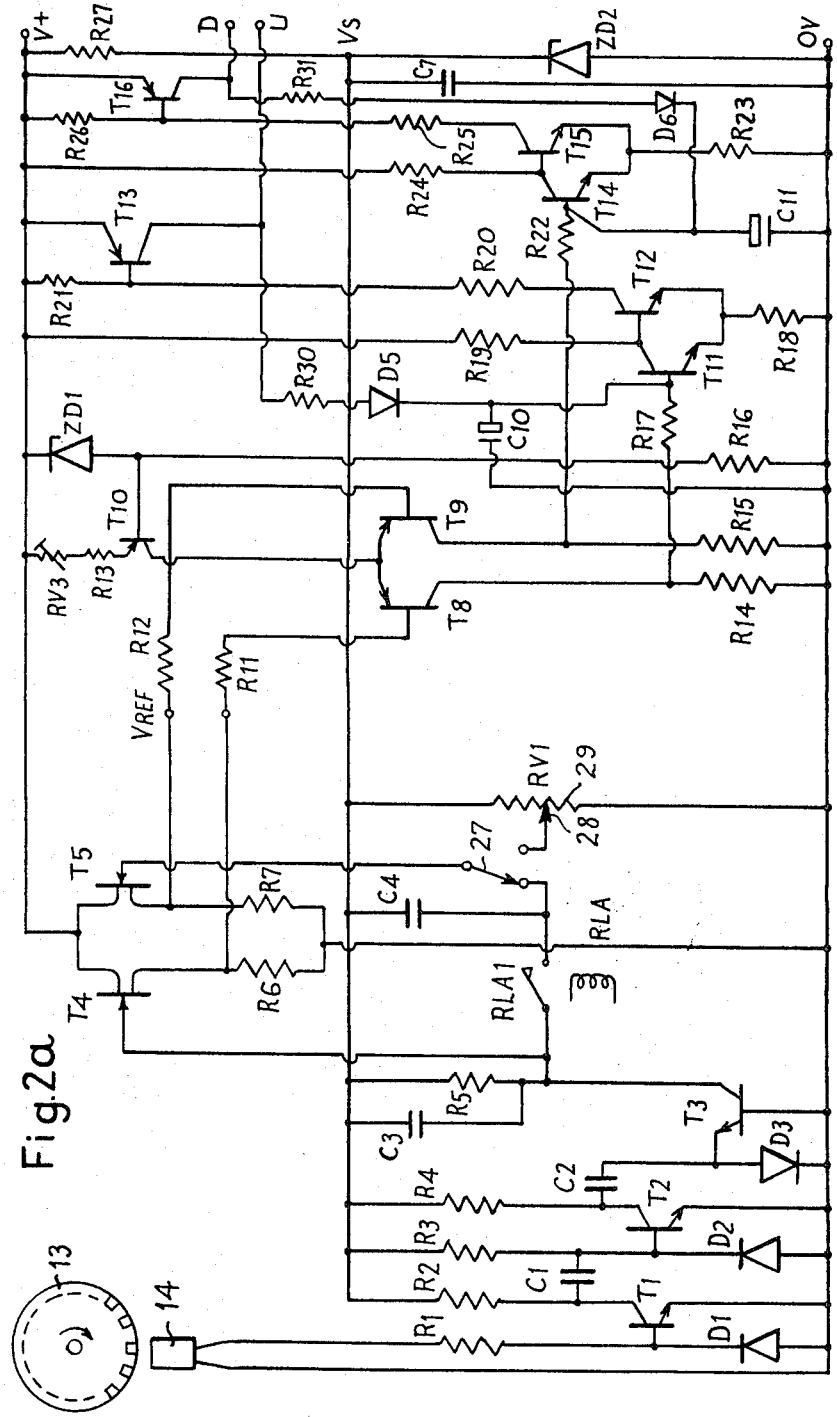

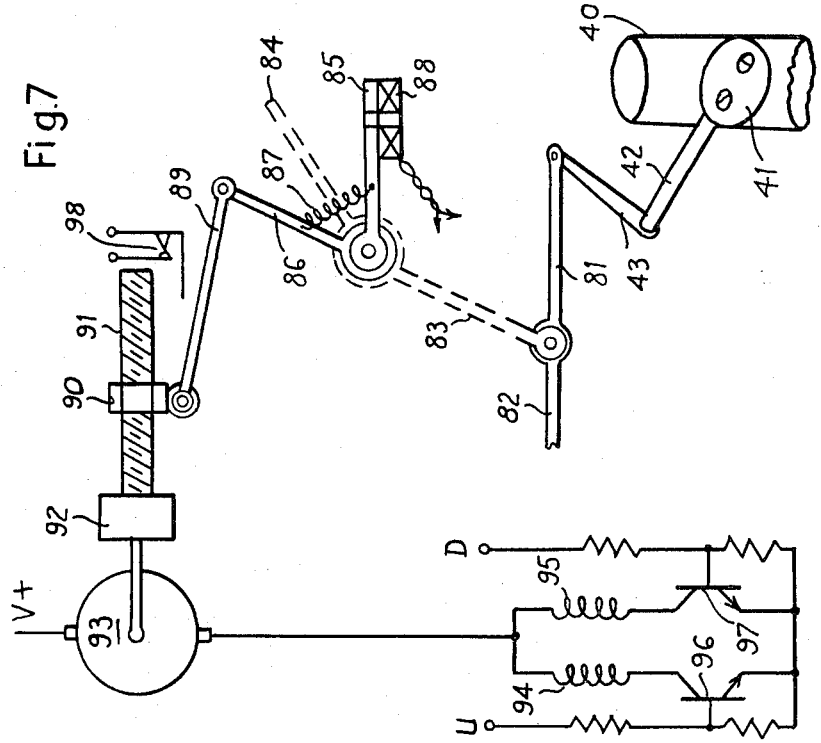
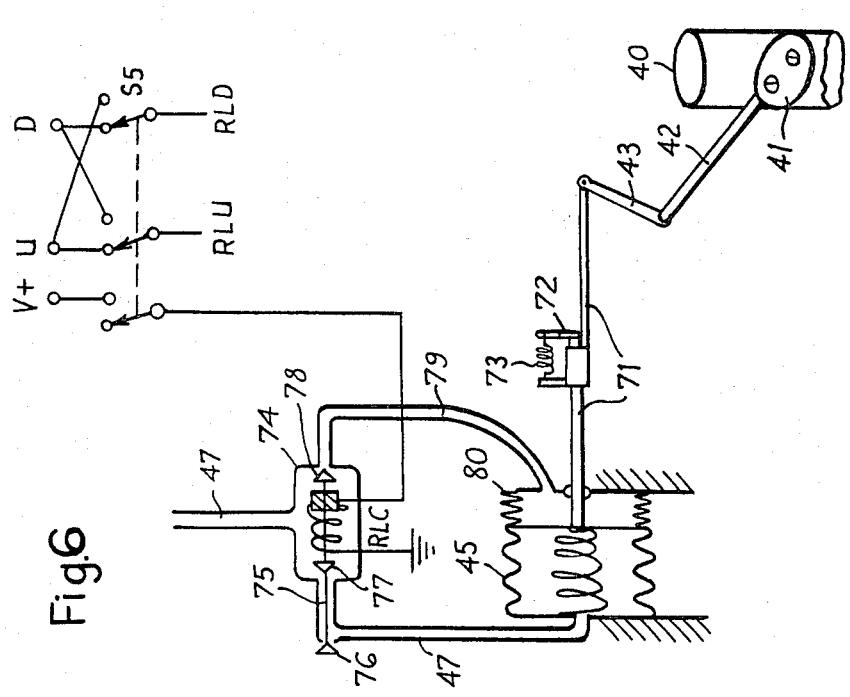

SPEED RESPONSIVE SYSTEMS

This invention relates to speed responsive systems and particularly, but not exclusively, to speed responsive systems for motor vehicles whereby the vehicle may be kept at a predetermined speed, or the driver may be warned when a predetermined speed is reached.

According to the invention, a speed responsive system includes means for generating an electrical voltage which changes with rotational speed of a rotatable member, means for generating a reference voltage, and comparator means for comparing the voltages, the comparator being arranged to emit or change its output signal when the speed responsive voltage, or a voltage derived therefrom, reaches the reference voltage. Preferably the speed responsive system includes a feedback loop arranged so that the output signal of the comparator, or a voltage controlled thereby is formed into pulses of which the average value increases with the difference between the speed responsive voltage and the reference voltage.

Conveniently the pulses are of substantially constant width and of a frequency which increases with the difference between the speed responsive voltage and the reference voltage. Alternatively there is added to the speed responsive voltage a voltage which changes with rate of change of the speed responsive voltage, the addition of the speed responsive voltage and rate of change voltage being such that the combined voltage will reach the reference voltage before the speed responsive voltage alone reaches the reference voltage.

Conveniently the speed responsive voltage increases with increasing rotational speed of the member, and may be substantially proportional to the rotational speed of the member.

Advantageously the rate of change voltage is substantially proportional to the rate of change of the rotational speed of the member.

According to a feature of the invention, the rotatable member may be driven by a prime mover having a control member for adjusting the output torque of the prime mover, and the output signal from the comparator is fed to means for adjusting the control member so as to regulate the rotatable member to a substantially constant speed.

According to another feature, the rotatable member may be driven by a prime mover having a driver-operable control member for adjusting the output torque of the prime mover, and the output signal from the comparator indicates to the driver when the rotatable member reaches a predetermined speed. Preferably the comparator output signal is used to generate a force tending to move the driver-operable control member in a direction which changes the rotatable speed towards a predetermined speed, against the action of the driver.

According to a further feature, the rotatable member may be driven by a prime mover having a driver-operable control member for adjusting the output torque of the prime mover, and the output signal from the comparator is used to prevent the speed of the rotatable member exceeding a predetermined speed, irrespective of any movement of the driver-operable control member by the driver tending to increase the rotatable member speed.

Suitably the reference voltage is produced by a potentiometer means across a supply voltage.

Alternatively the reference voltage is a voltage stored in an electrical memory circuit by feeding into the memory circuit the speed responsive voltage at an appropriate speed.

Conveniently the speed responsive voltage also feeds a voltmeter calibrated in terms of rotatable member speed.

In the case where the speed responsive voltage is produced from electrical pulses of which the frequency is proportional to the rotatable member speed, the pulses may be fed to a pulse counter to indicate the number of rotatable member rotations.

Various embodiments of the invention are described, by way of example only, with reference to the accompanying drawings in which:

FIG. 2 is a circuit diagram of part of FIG. 1,

FIG. 2a is an alternative circuit to FIG. 2,

FIGS. 4 to 10 are diagrammatic sketches of parts of the speed responsive system controlled by the circuit diagram shown in FIG. 2.

Figure 1:
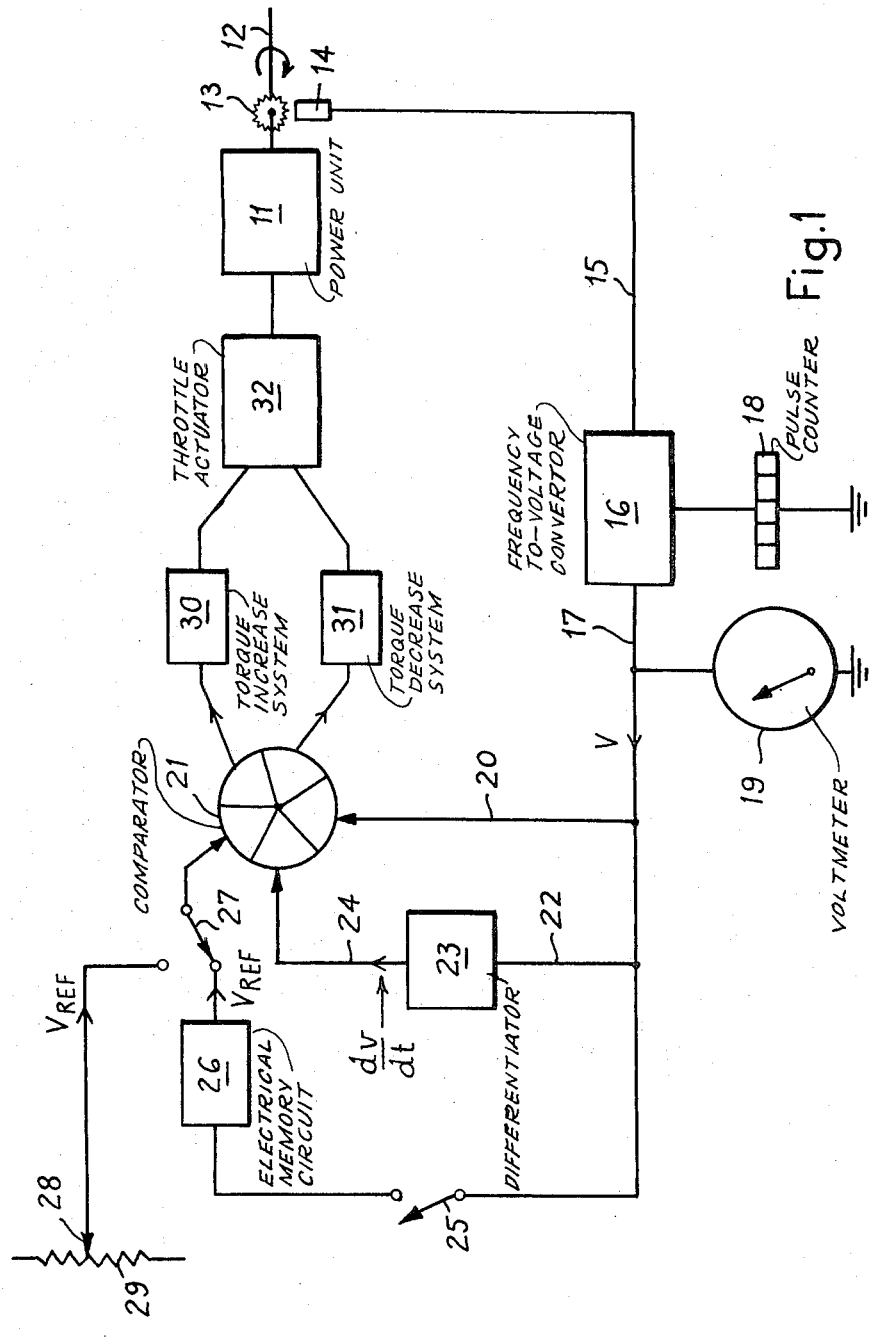
FIG. 1 is a diagrammatic layout of the speed responsive system.

In FIG. 1 a vehicle power unit 11 includes the usual engine and gear box and drives an output shaft 12 to which is fastened a ferrous-toothed disc or wheel 13. Adjacent the toothed wheel 13 is an inductive transducer 14 of the kind which emits an electrical pulse as each tooth on the wheel 13 passes. The pulse passes along a line 15 to a frequency-to-voltage convertor 16 which emits an electrical voltage proportional to pulse frequency along a line 17. A pulse counter 18 is also fed with the pulses and can be calibrated in terms of numbers of rotations of the shaft 12 or, in a vehicle, in terms of distance travelled. A voltmeter 19 is connected to the line 17 and is calibrated in terms of rotational speed of the shaft 12 or in terms of the vehicle speed. A voltage V in line 17 is fed by a line 20 as one input to a comparator 21. The voltage V is also fed by a line 22 to a differentiator 23 of which the output voltage is proportional to the rate of change of voltage V and is also fed by a line 24 as an input to the compratator 21.

The voltage V is also fed through a set-memory switch 25 to an electrical memory circuit 26. The latter sustains an output voltage which is equal to the value of the voltage V whenever the switch 25 is momentarily closed. The memory circuit 26 output voltage is fed as a third input voltage V ref. into the comparator 21 through a switch 27. Alternatively V ref. can be derived from the slider 28 of a potentiometer 29 connected across the supply voltage and coupled to the comparator 21 by the switch 27 in its other position.

When the comparator 21 emits an output signal it is fed to one of two torque changing systems, namely either to a torque increase system 30 or to a torque decrease system 31. The torque increase and decrease systems 30, 31 are arranged to operate a throttle actuator 32, movement of which increases or decreases appropriately the output torque of the power unit 11.

Figure 2:
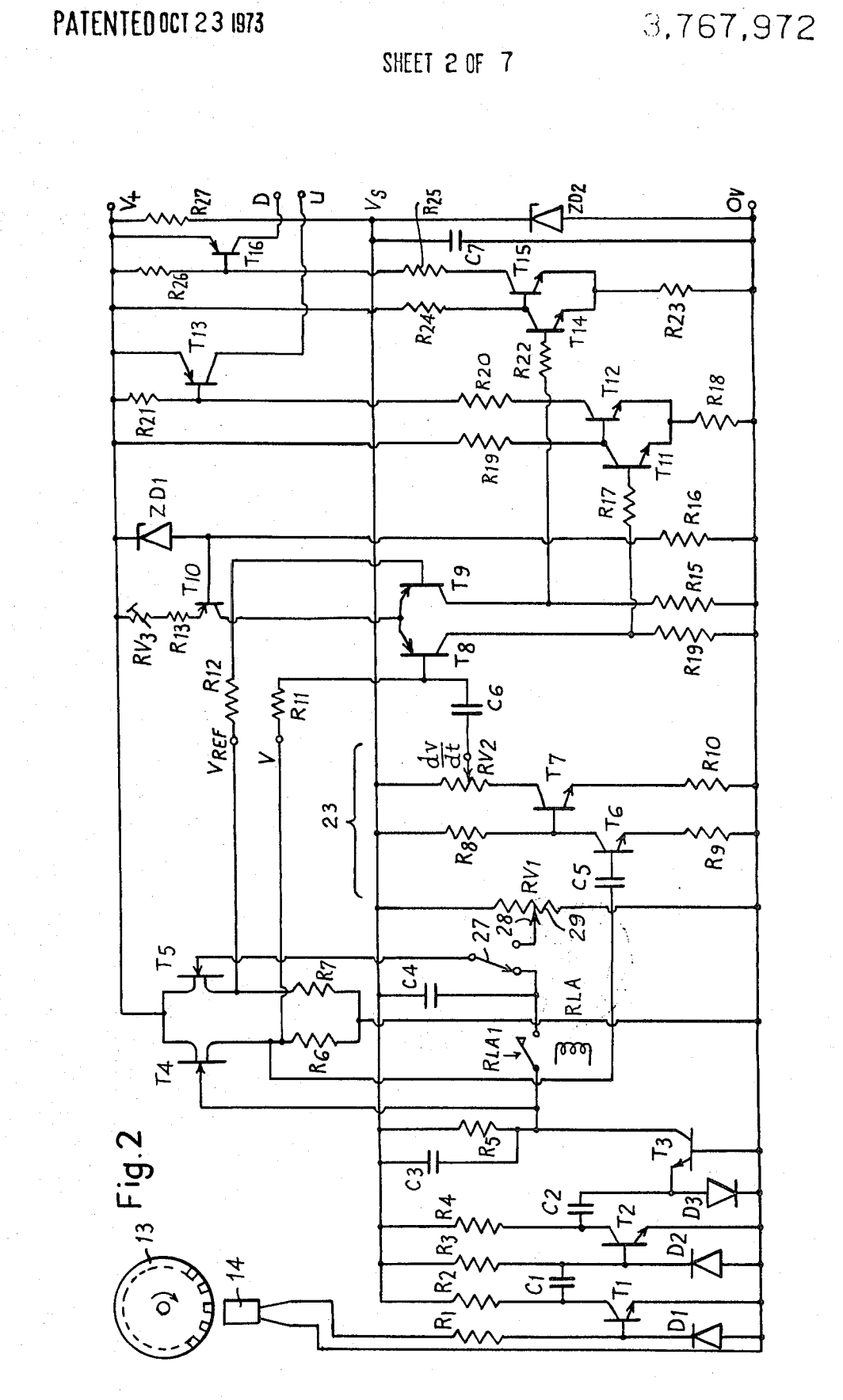

In FIG. 2, transistors $T_1$ and $T_2$, protected from reverse voltages by diodes $D_1$ and $D_2$, amplify and limit the voltage picked up by the transducer 14 due to the motion of the toothed wheel 13. The train of constant width constant amplitude pulses at the output of condenser $C_2$ feeds a diode/transistor pump circuit $D_3$, $T_3$ producing a voltage, at $T_3$ collector relative to a stabilized voltage Vs, which is proportional to the rotational speed of the toothed disc 13. This voltage may be set into a memory capacitor $C_4$ by momentarily closing set-memory relay contacts RLA 1 which contacts correspond to those of the switch 25 in FIG. 1.

Field effect transistors $T_4$ and $T_5$ buffer the speed-proportional and memory voltages producing V and V ref. which are fed to the comparator 21. Since an F.E.T. has a very high input impedance, V ref. stays substantially constant with time.

If required, V ref. may be derived from the potentiometer 29 to give a preset speed, which may be adjusted by the driver to give control or governing of an attained vehicle speed, or it may be set and locked by the vehicle owner to give limitation of vehicle speed.

The voltage V is fed to the differentiator circuit 23 formed by transistor $T_6$, $T_7$, and associated components $C_5$, $R_8$, $R_9$, $R_{10}$. The output voltage $dv/dt$ is proportional to the rate of change of V.

The voltages V ref., V and $dv/dt$ are fed to the comparator circuit 21 consisting of a differential amplifier formed by transistor $T_8$ and $T_9$, with constant current drive from transistor $T_{10}$ and associated components. Each torque changing system 30, 31 comprises a Schmitt trigger circuit and driver, including transistors $T_{11}$, $T_{12}$, $T_{13}$, for torque increase, and transistors $T_{14}$, $T_{15}$, $T_{16}$ for torque decrease.

Under normal driving conditions with the circuit on but not set to control or govern the speed, the set-memory relay is energised to close contacts RLA 1, and V always equals V ref., and may vary with speed from Vs + VGs down to about Vs/2 + VGs (VGs being the equal gate source voltages of the two matched F.E.T.'s $T_4$ and $T_5$). Because of the comparator constant current drive, the comparator circuit input voltages, at the collectors of transistors $T_8$ and $T_9$, are constant and equal. The input transistors are on so that the output and drive transistors $T_{13}$, $T_{16}$ are off and no drive currents are available from the output terminals D and U.

In a control or governing mode the memory relay contacts RLA 1 are opened and V ref. is constant. If the speed of the shaft 12 varies then V varies. If V goes greater than V ref. the torque-increase circuit is operated while the torque-decrease circuit is off. $T_{11}$ goes off, $T_{12}$ and $T_{13}$ come on and current is available, from the output terminal U for driving the throttle actuator 32.

If V goes less than V ref. the torque-decrease circuit is operated while the torque-increase circuit is held off. $T_{14}$ goes off, $T_{15}$ and $T_{16}$ come on and current is available, from the output terminal D, for driving the throttle actuator 32.

The differentiator feeds the comparator 21 with a voltage $dv/dt$, proportional to rate of change of output shaft speed. This has the effect of stabilizing the system, by filling in the inevitable dead band which exists between the torque increase and torque decrease control modes. The use of the "bang-bang" system with differential stabilization means that the throttle actuator design is simplified. It is either on, in one or another direction, or inoperative in the dead band, thereby increasing the system efficiency as regards supply current consumption compared with a proportional control system.

The action of the differentiator circuit 23 is as follows. When a drive signal is initiated the throttle is moved to alter the shaft speed. As the speed alters, V alters, so a level $dv/dt$ appears at the comparator which adds or subtracts from V in an attempt to inhibit the drive signal. The drive signal is therefore cancelled whilst the speed is still in the trigger dead band. For a large error in V, for example when a vehicle suddenly encounters a steep hill, the drive current will pulse on and off rapidly until the dead band is reached, giving in effect an inching action to the throttle. The system is therefore stabilized by the anticipatory action of the differentiating circuit.

FIG. 2a shows an alternative circuit to FIG. 2, which is in effect a pulse operated proportional control system, although both circuits have much in common. The differentiator circuit is omitted in FIG. 2a and in its place there are incorporated two feedback loops, one from each output terminal D and U. The feedback loop from terminal U comprises a feedback resistor $R_{30}$, diode $D_5$ and capacitor $C_{10}$ connected, as shown, to the terminal U, the base of transistor $T_{11}$ and the 0 volts line. The feedback loop from terminal D comprises feedback resistor $R_{31}$, diode $D_6$ and capacitor $C_{11}$ connected to the terminal D, the base of transistor $T_{14}$ and the 0 volts line.

The action of the feedback loop from the terminal U is as follows, the action of the loop from terminal D being identical. Normally the first transistor $T_{11}$ of the relevant Schmitt trigger is on, and transistor $T_{12}$ is off, the driver transistor $T_{13}$ being off also. Because of the diode $D_5$ there is no feedback. As the input voltage to transistor $T_{11}$ drops due to an error voltage from the comparator, the transistor $T_{11}$ become switched off so that the transistor $T_{13}$ comes on and its output voltage rises to V+, which is above the input voltage of transistor $T_{11}$. Therefore, current feeds back through capacitor $C_{10}$ which raises the input voltage of transistor $T_{11}$ to switch it on and thereby switch the driver transistor $T_{13}$ off. Capacitor $C_{10}$ discharges through the resistances $R_{17}$ and $R_{14}$ until the original voltage is reached, when the cycle is repeated. In this way a series of pulses appear at the terminal D, the pulses being of substantially constant width (E.G. 20 mS) determined by the time constant of capacitor $C_{10}$ and resistance $R_{30}$. Each Schmitt trigger and output driver is effectively a voltage operated pulse generator. The pulse frequency increases with the error signal until the relay or other drive circuit operated by the terminal D cannot respond to the frequency and stays on for large errors. If required the differentiator may be retained to give improved stability in difficult applications.

Figure 3:
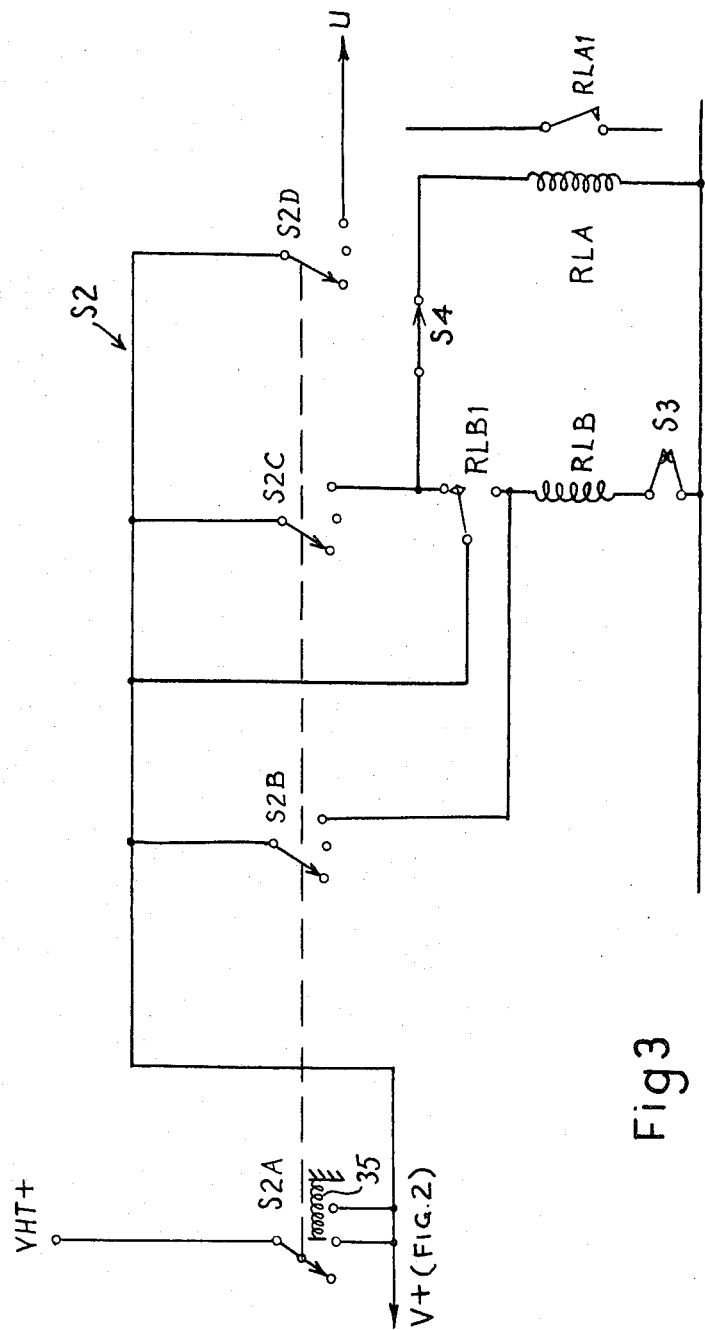
FIG. 3 is a detail circuit diagram of part of FIG. 1.

The system programming circuitry is shown in FIG. 3. By adding in various switch functions the various modes of operating the speed responsive system may be realized.

$S_2$ is a main selector switch having three positions and biased towards the third position by a spring 35. In the "off" position as shown, the circuits are de-energised. In the "on" or centre position of $S_2$ the contacts $S_{2A}$ of switch $S_2$, connected to the vehicle supply line voltage $V_{HT+}$, are closed, and as a result the control circuit is energized and the memory relay contacts RLA 1 of memory relay RLA are closed due to current flowing via contacts RLB 1 of relay RLB and switch $S_4$, through the winding of memory relay RLA. The voltage on the memory capacitor $C_4$ is therefore always equal to the output voltage of the frequency-to-voltage converter 16, provided that switch 27 is set to the memory position. When the switch $S_2$ is depressed to the third or biased "AUTO" position the relay RLB is energised via closed switch contacts $S_{2B}$, changing over contacts RLB 1 which hold-in RLB when $S_2$ is released to the "ON" position. RLA is de-energised, so V ref. is now constant at a voltage decided by that stored on the memory capacitor $C_4$. The system is now in the control or governing mode and the shaft speed will be maintained substantially constant. A set of drop-out contacts $S_3$ is arranged in series with RLB so that if the vehicle brake or clutch pedal is depressed the system drops out of "AUTO" and into the "ON" condition.

Advance of the controlled or governed speed may be obtained by holding $S_2$ in the "AUTO" position when RLA is held energized, via contacts $S_{2C}$ and torque increase current is provided to the throttle actuator 32 via contacts $S_{2D}$. The vehicle speed increases and V and V ref. increase together until $S_2$ is released. Retard of the controlled or governed speed is obtained by switching to "off", than back to "on" when the throttle will close. When the desired speed is reached, "AUTO" is reselected to resume control. If a preset cruising speed is required, switch 27 is set to the reference position, when the speed is governed by the setting of potentiometer 29. The slider 28 may be calibrated in m.p.h. and any desired cruise speed may be set. Upon selecting "AUTO" the throttle will be actuated to maintain the speed at that preset on potentiometer 29. The setting may be altered at will to advance or retard the speed by adjusting slider 28.

To return to a previously attained speed after initially reaching the speed, switch $S_4$ is opened thereby isolating RLA. When the system is dropped out RLB is arranged mechanically, or electrically via another pair of contacts, to inhibit actuator action. The reference voltage remains stored on the memory capacitor $C_4$. When "AUTO" is again selected the vehicle speed will return to the previous value.

To remind the driver when the preset speed is reached or to limit the vehicle's speed it is necessary to use a modified actuator. Basic control circuitry is the same as in FIGS. 2 and 3.

Figure 5:
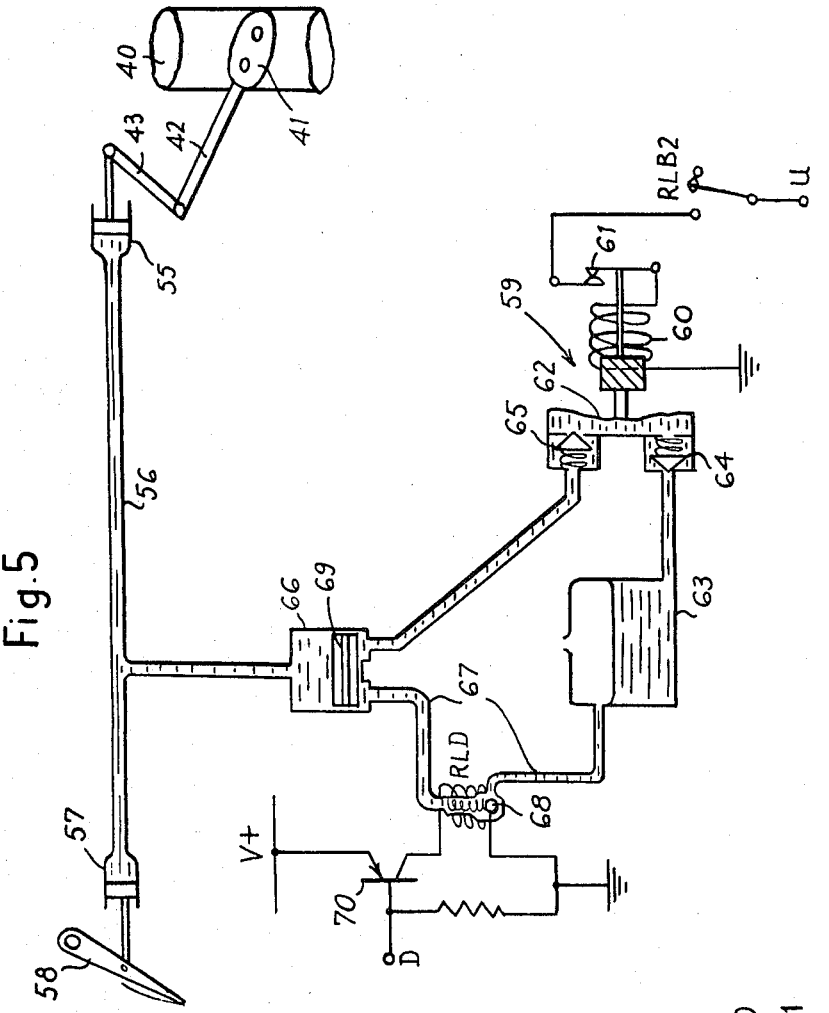
Figure 4:
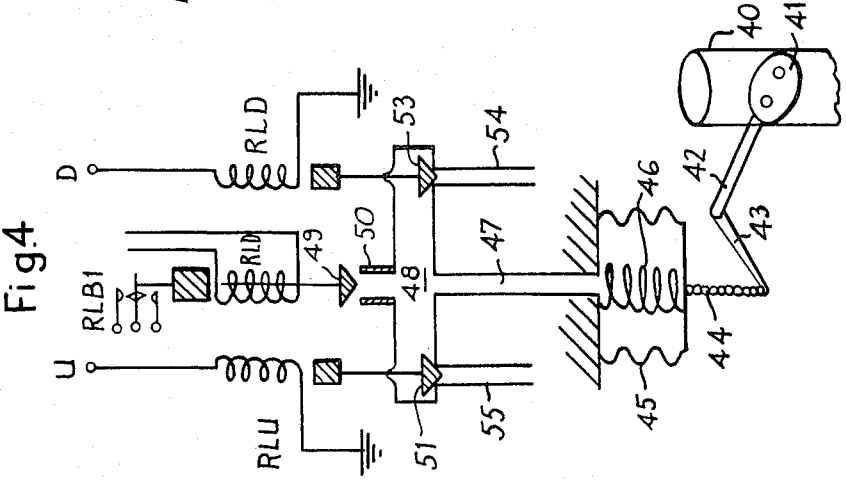

Various methods of actuation are shown in FIGS. 4 to 10. FIGS. 4 and 5 show relay driven control actuators.

In FIG. 4 air or mixture is fed to an engine (not shown) through an intake duct 40, having a normal throttle butterfly valve 41 rotatable by a spindle 42. In addition to the normal throttle linkage (not shown) connected to rotate the spindle 42, there is fixed at one end an arm 43 connected by a chain 44 to a vacuum bellows actuator 45. A precompressed spring 46 normally extends the bellows 45 towards the closed throttle position of the engine butterfly throttle valve 41.

The bellows 45 are connected by a duct 47 to an air control chamber 48. When the system is set to "AUTO" relay RLB operates to move valve member 49 to close an air bleed 50 into the air chamber 48.

When a torque increase voltage appears at terminal U solenoid RLU is energised to raise a valve member 51 which admits manifold vacuum from the engine inlet manifold through a pipe 52 into the air chamber 48. The ensuing depression in the air chamber 48 causes the bellows 45 to retract and open the throttle valve 41. When the voltage on terminal U is removed the valve member 51 again closes so that the throttle valve 41 will be held at the obtaining position. If a torque decrease voltage appears at terminal D a solenoid RLD is energised which raises a valve member 53 to admit air at atmospheric pressure through a pipe 54 into air chamber 48. Thereupon the spring 46 causes the bellows 45 to expand and move the throttle valve 41 towards its closed position.

In FIG. 5 the arm 43 is rotated by a hydraulic slave cylinder and piston assembly 55 which is connected by a pipe 56 to a hydraulic master cylinder and piston assembly 57, of which the piston is moved by the throttle pedal 58. In normal use therefore, the connection between the throttle pedal 58 and the arm 43 is by a normal hydrostatic link.

An electric pump of the vibrating disphragm type commonly used as a petrol pump in vehicles is indicated generally at 59. The pump 59 has a solenoid 60 which, by its intermittant energization through contacts 61, causes a diaphragm piston 62 to be drawn back and forth. This movement draws liquid from a reservoir 63 through an inlet non-return valve 64 and forces it out through an outlet non-return valve 65 into the base of a hydraulic cylinder 66. The pumped liquid circuit is completed by a return pipe 67 which discharges into the reservoir 63, but is normally closed by a solenoid-operated ball valve 68. The pump 59 operates when a torque increase voltage appears at the terminal U. Since the return pipe 67 is then closed, the pumped liquid entering the cylinder 66 causes the free piston 69 therein to rise, displacing liquid from the member part of the cylinder 66 into the pipe 56, thereby opening the throttle valve 41 irrespective of the movement of the throttle pedal 58.

When the voltage at terminal U is removed and a torque decrease voltage appears at terminal D, a power transistor 70 conducts to pass energising current through the solenoid RLD which opens the ball valve 68 to discharge liquid from below the free piston 69 into the reservoir 63, thereby moving the throttle valve 41 towards its closed position. In this system the relay RLB is an ordinary relay with two sets of contacts. One set, RLB 1, holds the system "ON"; the other set, RLB 2, isolates the diaphragm pump in the "OFF" and "ON" positions, unless "AUTO" is selected.

FIGS. 6 and 7 show two types of dual purpose actuator. These may be used for control and 'remind' functions. In FIG. 6 the arm 43 is moved by a spring biased vacuum bellows actuator as in FIG. 4. In this case the latter is connected to the arm 43 by a rod 71, having a sliding joint 72 at its center. The sliding joint 72 is normally held rigid by a pre-tensioned spring 73 to give direct connection between the bellows 45 and arm 43. The control system in FIG. 6 is generally as in FIG. 4, except that an additional air chamber 74 is provided in the duct 47 connected to the chamber 48 of FIG. 4. In the control mode air can pass freely along the duct 47 and through the further air chamber 74.

When the system in FIG. 6 is to operate in a mode where the driver will be reminded when a predetermined speed is reached, a switch $S_5$ is moved from a control position to a 'remind' position. The switch $S_5$ in the 'remind' position reverses the connections from the U and D terminals to the respective sloenoids RLU and RLD, and also connects the power supply to energise a solenoid valve RLC in the further air chamber 74. When the solenoid RLC is energised its valve member 75 is moved to vent the bellows 45 to atmosphere through a valve 76, and to close them off from the air chamber 48 by a valve 77. A valve 78 is also opened to connect the air chamber 48 through a duct 79 to further bellows 80, which are also connected to the rod 71. If the vehicle speed is below the 'remind' speed a torque increase voltage appears at terminal U, which allows air to bleed into the further bellows 80 and give a normal feel to the throttle pedal. If the vehicle speed is above the 'remind' speed a reduced torque voltage appears at terminal D, which applies vacuum to the further bellows 80. The latter try to move the rod 71 to the right in FIG. 6 and push the throttle pedal back against the driver's foot, giving the pedal a 'hard' feel.

If the driver wishes to exceed the 'remind' speed, the extra force in the rod 71 causes the sliding joint 72 to give. The driver is reminded of his excess speed by the extra pedal forces. A buzzer or a lamp may be connected to the terminal D to give additional warning.

In FIG. 7 the arm 43 is pulled to the left by a link 81 to open the throttle. The end of the link 81 remote from the arm 43 is pivoted to a rod 82 connected to the throttle pedal, and is also connected to one arm 83 of a bell crank lever, of which the other arm 84 is made of ferro-magnetic material such as mild steel. The bell crank lever is mounted on a common pivot with an actuator paddle 85 and with a further arm 86. The actuator paddle 85 and further arm 86 are connected by a tension spring 87. The actuator paddle 85 carries an electro-magnet 88 which when energised attracts and can clamp the actuator paddle 85 to the bellcrank lever arm 84.

The further arm 86 is connected by a link 89 to a nut 90 which travels along a screw 91 when the latter is rotated. The screw 91 is driven through an appropriate gearing 92 by a split field electric motor 93, having field windings 94, 95. The field windings 94, 95 are controlled by the U and D terminals through power transistors 96, 97 respectively.

When the nut 90 reaches the right hand end of the screw 91 it operates a limit switch 98 in series with the motor field winding 94 to prevent further operation of the motor in that direction.

When the system is inoperative the nut 90 is driven to its right hand (i.e. full throttle) position, so that the actuator paddle 85 is out of the way of the bell crank lever arm 84. The driver can therefore use the throttle pedal in the normal manner. In the control mode when the system is set to "AUTO" and the required speed is reached, the electromagnet 88 is energised in parallel with relay RLB. The throttle pedal is depressed until the paddle 84 reaches the actuator paddle 85, when the electro-magnet 88 clamps them together. If the speed of the vehicle increases, the actuator paddle 85 is driven back towards the closed throttle position by the electric motor 93 being fed with current at the D terminal until the correct throttle position for the required speed is attained. Since the limit switch 98 is now closed, current is fed to the D or U terminals as appropriate to maintain constant road speed. The driver may exceed the control speed by extra throttle pedal pressure, which will extend the spring 87. He may regain normal operation by switching the control switch off or by pressing the brake pedal, so that the electro-magnet 88 becomes de-energised. The vehicle speed then drops and actuator paddle 85 is driven to the full throttle position, thereby opening the limit swtich 98.

When the control switch is set to the "speed remind" position the electro-magnet 88 cannot be energised. When the vehicle speed is below the 'remind' speed the actuator paddle 85 is at its full throttle position. If the vehicle speed exceeds the 'remind' speed the actuator paddle 85 is driven down against the throttle paddle 84 and the driver feels extra pressure on his foot. The driver may drive with his foot lightly on the throttle pedal so that he can just feel the extra pressure, and the vehicle speed will then be maintained at the selected value.

The 'remind' speed may be exceeded for emergency purposes by extra pressure on the throttle pedal, causing the spring 87 to extend.

Figure 9:
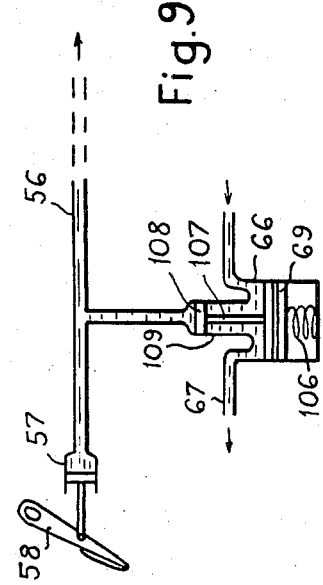
Figure 10:
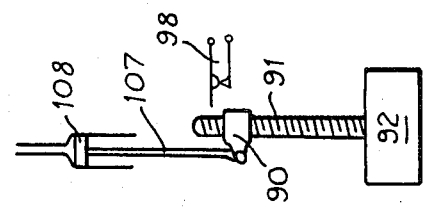
Figure 8:
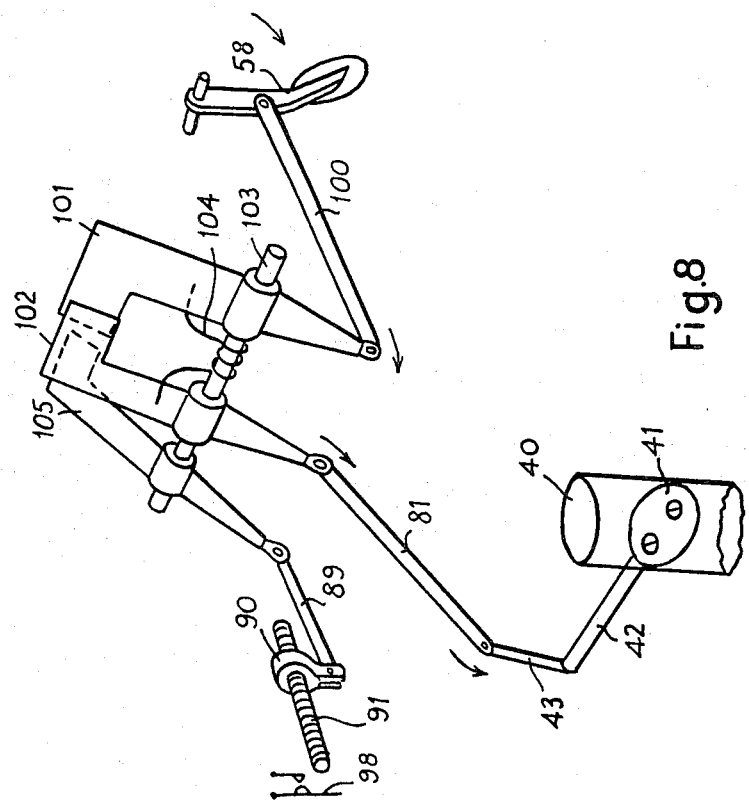

FIGS. 8, 9 and 10 show types of speed limiting actuators. These allow the driver to drive with the throttle pedal in the full-throttle position while the control system adjusts the throttle 41 to maintain a preset speed. This type of system would be used, for example, on commercial vehicles, hire cars or power boats, where the owner wished to restrict the maximum output shaft speed.

FIG. 8 shows an adaption of the system illustrated generally in FIG. 7. In FIG. 8 the throttle pedal 58 is connected by a link 100 to a paddle 101. The link 81 connected to the throttle arm 43 is also connected to paddle 102, the paddles 101, 102 being freely pivoted on a common shaft 103. Overlapping portions of the paddles 101, 102 are arranged so that as the throttle pedal 58 returns towards the closed throttle position, the paddle 101 forces the paddle 102 to close the throttle 41. However, contact between the paddles 101, 102 in the throttle opening direction is maintained only by a spring 104 for example a strong hairpin spring suitably arranged. The nut 90 is connected through its link 89 to a further paddle 103, also freely pivoted on the shaft 103. Part of the paddle 105 engages behind part of the paddle 102. In this way when the governed or controlled speed is exceeded, nut 90 will move towards the closed throttle position driven by a motor actuator (not shown) so that the paddle 105 contacts the paddle 102 and forces it to rotate so as to close the throttle 41. The spring 104 enables the paddle 101 to be left behind even if the throttle pedal is at its full throttle position.

This system shown in FIG. 8 is equally applicable to the system shown generally in FIG. 4 if the bellows 45 are connected to the link 89 in place of the nut 90.

FIG. 9 shows an adaption of a system shown generally in FIG. 5 to achieve a control or governing mode. In this case the feed line from the hydraulic pump 59 (not shown) and the return line 67 feed into the cylinder 66 above the piston 69. The piston 69 is urged to the top of the cylinder 66 by a spring 106. The piston 69 is connected by a rod 107 to a smaller piston 108 in a corresponding cylinder 109. Upward movement of the pistons 69, 108 displaces liquid into the pipe 56 so as to open the throttle. In this case the supply of current to the terminals D or U will cause appropriate quantities of liquid to be pumped by the piston 108 into or out of the pipe 56, to provide corresponding opening or closing of the throttle, irrespective of the position of the throttle pedal 58.

FIG. 10 shows a further modification of the system shown in FIG. 9, in which movement of the piston 108 is effected by the electric motor-driven screw and nut system shown generally in FIG. 7.

We claim:

1. A speed responsive system, including means for generating an electrical voltage which changes with rotational speed of a rotatable member, means for generating a reference voltage, comparator means for comparing the voltages, the comparator means being operable to produce an output signal which changes when the speed responsive voltage reaches the reference voltage, pulse generator circuit means including a time constant feedback loop, connected to the output of the comparator means, operable to form the output signal of the comparator means into substantially constant width pulses of which the average value increases with the difference between the speed responsive voltage and the reference voltage, and of which the frequency increases with the difference between the speed responsive voltage and the reference voltage.

2. A speed responsive system as claimed in claim 1, including a differentiator circuit connected to the voltage generating means and adapted to produce an output voltage which changes with rate of change of the speed responsive voltage, the output of the differentiator circuit being connected to the comparator means, the comparator means being adapted to add the speed responsive voltage to the rate of change voltage thereby to cause the combined voltage to reach the reference voltage before the speed responsive voltage alone reaches the reference voltage.

3. A speed responsive system as claimed in claim 4, wherein the differential circuit is adapted to produce a rate of change voltage substantially proportional to the rate of change of the rotational speed of the member.

4. A speed responsive system as claimed in claim 1, wherein the rotatable member is driven by a prime mover having a driver-operable control member for adjusting the output torque of the prime mover, and the output signal from the comparator is used to prevent the speed of the rotatable member exceeding a predetermined speed, irrespective of any movement of the driver-operable control member by the driver tending to increase the rotatable member speed.

5. A speed responsive system as claimed in claim 1, wherein the voltage generating means is connected to a voltmeter calibrated in terms of rotatable member speed.

\* \* \* \* \*